United States Patent
Eschenbach

(12) 
(10) Patent No.: US 6,715,779 B2
(45) Date of Patent: Apr. 6, 2004

(54) EXERCISE SCOOTER WITH STUNT FEATURES

(76) Inventor: Paul William Eschenbach, 290 S. Tyger La., Roebuck, SC (US) 29376

( * ) Notice: Subject to any disclaimer, the term of this patent is extended or adjusted under 35 U.S.C. 154(b) by 218 days.

(21) Appl. No.: 10/033,624

(22) Filed: Jan. 2, 2002

(65) Prior Publication Data

US 2003/0001349 A1 Jan. 2, 2003

Related U.S. Application Data

(63) Continuation-in-part of application No. 09/895,572, filed on Jul. 2, 2001.

(51) Int. Cl.⁷ ............ B62M 1/00; B62D 61/06; A63B 69/16
(52) U.S. Cl. ............ 280/221; 280/62; 280/253; 280/87.05; 482/57; D12/114
(58) Field of Search ............ 280/63, 62, 87.01, 280/87.02, 87.041, 200, 250, 255, 256, 257, 258, 259, 247, 248, 263, 827, 828, 221, 87.05, 253, 239, 293, 291, 296; 482/57; D12/114

(56) References Cited

U.S. PATENT DOCUMENTS

| | | |
|---|---|---|
| 374,287 A | 12/1887 | Benfield |
| 634,062 A | 10/1899 | Matthews |
| 1,273,906 A | 7/1918 | Nickey |
| 1,323,004 A | 11/1919 | Boyd |
| 1,472,375 A | 10/1923 | Stuart et al. |
| 1,537,729 A | 5/1925 | Banks |
| 1,557,634 A | 10/1925 | Walter ............ 280/221 |
| 1,617,357 A | 2/1927 | Walter ............ 280/221 |
| 1,799,947 A * | 4/1931 | Benjamin ............ 280/221 |
| 1,800,123 A * | 4/1931 | Wagen ............ 280/221 |
| 1,977,035 A | 10/1934 | Benjamin ............ 280/221 |

(List continued on next page.)

FOREIGN PATENT DOCUMENTS

DE    003831220 A1 *   3/1990   ............ 280/228

*Primary Examiner*—Brian L. Johnson
*Assistant Examiner*—G B Klebe

(57) ABSTRACT

A compact scooter supported by a pair of wheels is propelled by the cyclic operation of a pair of stabilized pedals by a standing user with hands on a handlebar. The elongate pedals having curved ends are connected to a crank and rocker link for predetermined pedal angles configured to maintain heel contact during the cyclic operation. The feet are positioned on pedal extensions with the heels of the feet rearward of the crank pivots to develop superior crank torque imposed upon the wheels for faster speed and better startup acceleration. Stunt features are provided to perform wheelies, rail grinding and step maneuvers.

24 Claims, 2 Drawing Sheets

U.S. PATENT DOCUMENTS

| | | | | |
|---|---|---|---|---|
| 2,466,105 A | * | 4/1949 | Hoffman | 280/221 |
| 2,641,249 A | | 6/1953 | Brockman | 601/36 |
| 3,096,100 A | | 7/1963 | Clarke et al. | 280/261 |
| 3,284,096 A | | 11/1966 | Hansen | |
| 3,427,037 A | | 2/1969 | Marasco | |
| 3,653,679 A | | 4/1972 | Howard | |
| 3,888,511 A | | 6/1975 | Parrilla | |
| 3,997,185 A | | 12/1976 | Parrilla | |
| 4,012,054 A | | 3/1977 | Moore | |
| 4,053,173 A | | 10/1977 | Chase, Sr. | 280/253 |
| 4,153,268 A | | 5/1979 | Wilson et al. | |
| 4,154,452 A | | 5/1979 | Newman | |
| 4,367,883 A | | 1/1983 | Anderson | |
| 4,379,566 A | | 4/1983 | Titcomb | |
| 4,456,276 A | | 6/1984 | Bortolin | |
| 4,561,318 A | | 12/1985 | Schirrmacher | |
| 4,779,863 A | | 10/1988 | Yang | |
| 4,821,832 A | * | 4/1989 | Patmont | 180/208 |
| 4,846,488 A | * | 7/1989 | Szadkowski | 280/221 |
| 5,110,148 A | | 5/1992 | Stienbarger et al. | 280/221 |
| 5,207,442 A | * | 5/1993 | Gray et al. | 280/256 |
| 5,224,724 A | * | 7/1993 | Greenwood | 280/221 |
| 5,279,529 A | | 1/1994 | Eschenbach | |
| 5,330,221 A | | 7/1994 | Sutton | |
| 5,352,169 A | * | 10/1994 | Eschenbach | 482/57 |
| 5,368,323 A | | 11/1994 | Young | |
| 5,470,089 A | * | 11/1995 | Whitson et al. | 280/87.041 |
| D366,636 S | | 1/1996 | Smith | |
| 5,527,246 A | | 6/1996 | Rodgers, Jr. | |
| 5,611,758 A | | 3/1997 | Rodgers, Jr. | |
| 5,630,774 A | | 5/1997 | Geschwender | |
| 5,765,871 A | | 6/1998 | Wyman et al. | |
| 5,785,331 A | | 7/1998 | Rappaport | 280/87.041 |
| 5,836,854 A | * | 11/1998 | Kuo | 482/52 |
| 5,895,065 A | * | 4/1999 | Khomo | 280/221 |
| 5,899,474 A | | 5/1999 | Grutzik | 280/229 |
| 5,992,864 A | | 11/1999 | Dickson et al. | 280/87.041 |
| 6,077,198 A | * | 6/2000 | Eschenbach | 482/52 |
| 6,080,086 A | * | 6/2000 | Maresh et al. | 482/57 |
| 6,120,044 A | | 9/2000 | Tsai | 280/87.05 |
| 6,149,179 A | | 11/2000 | Long | |
| 6,250,656 B1 | | 6/2001 | Ibarra | 280/87.041 |
| 6,334,838 B1 | * | 1/2002 | Lee | 482/51 |
| 6,485,041 B1 | * | 11/2002 | Janssen | 280/221 |
| 2002/0077220 A1 | * | 6/2002 | Kuo | 482/51 |
| 2002/0151412 A1 | * | 10/2002 | Lee | 482/52 |
| 2003/0025293 A1 | * | 2/2003 | Drew | 280/253 |
| 2003/0040404 A1 | * | 2/2003 | Maresh | 482/51 |

* cited by examiner

EXERCISE SCOOTER WITH STUNT FEATURES

This application is a Continuation-in-Part of application Ser. No. 09/895,572 filed Jul. 2, 2001 titled EXERCISE SCOOTER.

BACKGROUND OF THE INVENTION

1. Field of the Invention

The present invention relates to a human powered exercise scooter. More particularly, the invention allows a standing user to power the wheeled scooter by moving stabilized pedals with the feet along a closed loop arcuate curve to drive at least one wheel of the scooter. Further, steering, hand brake and stunt features are provided.

2. Description of the Prior Art

The traditional kick scooter comprises a pair of small wheels, steering and a platform to support at least one foot. Propulsion is achieved by pushing the scooter with one foot in contact with the ground while the other foot remains on the platform. While this type scooter is popular today among youngsters, the scooter is slow as a means of transport with a bumpy ride and tends to exercise one leg differently than the other. Whitson et al. in U.S. Pat. No. 5,470,089 shows a scooter having larger wheels to improve the speed and comfort of a kick scooter. Rappaport in U.S. Pat. No. 5,785,331 adds a second foot board to the kick scooter for better support. Grutzik in U.S. Pat. No. 5,899,474 shows a velocipede type scooter using an eccentrically mounted front wheel in an attempt to enhance kick propulsion of a scooter. Dickson in U.S. Pat. No. 5,992,864 shows a scooter having larger wheels adapted from a bicycle. Tsai in U.S. Pat. No. 6,120,044 offers a foldable rollerboard as a scooter variation. All of this prior art, use kick propulsion.

Additional forms of human propulsion have also been tried for land transport. Chase in U.S. Pat. No. 4,053,173, Titcomb in U.S. Pat. No. 4,379,566, Bortolin in U.S. Pat. No. 4,456,276 and Schirrmacher in U.S. Pat. No. 4,561,318 use varying forms of up and down swing arms to propel scooters and bicycles.

The classic bicycle crank remains the most popular means to propel a bicycle for a seated user. However, freely rotating pedals do not provide sufficient support for mostly standup operation. The use of stabilized pedals as a means for propulsion start to appear with Boyd in U.S. Pat. No. 1,323,004 where a bicycle crank is adapted with an elongate pedal connected to the crank and to a rocker link pivoted at the rear of the bicycle for increased crank leverage.

Nickey in U.S. Pat. No 1,273,906 places the feet on a pair of elongate pedals connected to both a crank and a rocker link to drive a wagon. Walter in U.S. Pat. Nos. 1,557,634 and 1,617,357 shows a three wheeled scooter having foot platforms that rest on a roller in the front and drive a crank attached to the wheels in the rear. Stienbarger et al. in U.S. Pat. No. 5,110,148 shows a three wheeled scooter having foot platforms that drive a crank attached to a pair of wheels. Another three wheeled scooter is shown by Benjamin in U.S. Pat. No. 1,977,035 that has a pair of foot platforms that drive the rear wheels. Yang in U.S. Pat. No. 4,779,863 shows a pair of pedals on a scooter type device that swing up and down to drive the front wheel. Geschwender in U.S. Pat. No. 5,630,774 offers an exercise apparatus similar to a scooter having three wheels and pedals connected to both a crank and a rocker link pivoted over the rear wheel. None of this prior art address a stabilized pedal for propulsion that fully supports the heel of the foot during operation.

Brockman in U.S. Pat. No. 2,641,249 offers a stationary exercise cycle having a pedal braced to foot and upper leg during seated exercise. Eschenbach in U.S. Pat. No. 5,279,529 shows stabilized pedal platforms that maintains heel support for standing exercise and proposes a variation for bicycle propulsion. Rodgers, Jr. in U.S. Pat. Nos. 5,527,246 and 5,611,758 shows a mobile exercise apparatus having a pedal supported by complex linkage to follow a running motion as a means for propulsion.

The addition of a third wheel or roller has been known for quite some time on bicycles as a safety feature to prevent excessive elevation of the front wheel. Matthews in U.S. Pat. No. 634,062 shows a spring loaded third wheel added to a bicycle. Stuart et al. in U.S. Pat. No. 1,472,375 shows a pair of rollers added to a scooter to aid in the safe elevation of the front wheel. Banks in U.S. Pat. No. 1,537,729 and Marasco in U.S. Pat. No. 3,427,037 show a third wheel added to a wheeled toy horse for safer rearing. Wyman et al. in U.S. Pat. No. 5,765,871 shows a tricycle for front wheel elevation. Hansen in U.S. Pat. No. 3,284,096 shows a roller added to a bicycle to allow safer front wheel elevation. Howard in U.S. Pat. No. 3,653,679 offers a third wheel with extra seat for front wheel elevation. Thereafter, a variety of one or more wheels are offered as safety features by Moore in U.S. Pat. No. 4,012,054, Parrilla in U.S. Pat. Nos. 3,997,185 and 3,888,511, Wilson et al. in U.S. Pat. No. 4,153,268, Newman in U.S. Pat. No. 4,154,452 and Young in U.S. Pat. No. 5,368,323. The term "Wheelie" is used with the addition of rollers to bicycles in U.S. Pat. No. 4,367,883, Sutton in U.S. Pat. No. 5,330,221, Smith in U.S. Pat. No. D366,636 and Long in U.S. Pat. No. 6,149,179. In each example, the rider shifts body weight while remaining seated or on the pedals to elevate the front wheel.

The use of a step to mount a bicycle is shown by Benfield in U.S. Pat. No. 374,287. Arico in U.S. Pat. No. 3,96,810 provides a step that can be used to propel a bicycle in wheelie mode as a kick scooter.

None of this prior art offers a means for scooter propulsion that enhances the circular movement of a crank and fully supports the feet of a standing operator that allows the user to perform certain tricks. Hence, the need exists for an exercise scooter having stabilized pedals that fully support both feet of a standing operator and drive a crank to propel a wheel while allowing the user to perform certain tricks or stunts.

It is one objective of the present invention to provide stabilized pedals which follow a closed loop elongate curve that drives at least one wheel of an exercise exercise scooter. Another objective of this invention is to curve the pedal end for better heel support. Another objective of this invention is to provide a grinder bar allowing the user to elevate the scooter to be supported underneath by a stationary rail as a stunt. Another objective of this invention is to incorporate a step attached to the frame for foot support that allows another trick. Yet another objective of this invention is to provide a frame extension with foot pegs to allow easy wheelies for a novice rider.

SUMMARY OF THE INVENTION

The present invention relates to a wheeled exercise scooter having pedals for propulsion that can be used for exercise and to perform certain tricks or stunts. Pedals are provided that follow an orbital movement to propel the exercise scooter. Various features are added to the frame to facilitate certain stunts.

In the preferred embodiment, a frame capable of supporting a user is adapted for at least two wheels in contact with the ground. A first wheel is rotatably connected to a fork that is rotatably connected to the frame for steering. A handlebar extends upward from the fork to support the hands. The handlebar can be folded to lower the height of the scooter for stowage or transport. A second wheel is rotatably connected to the frame.

A crank is rotatably connected to the frame positioned adjacent the second wheel and protrudes on either side. The crank and second wheel are engaged with sprockets and a chain to form a drive coupling. A pair of foot support members having foot engaging pedals with curved ends are pivotally connected to the crank intermediate the ends. The curved ends provide better heel support in the upper positions of the pedals. A pair of guides in the form of rocker links are pivotally connected to the frame positioned adjacent the first wheel. The other end of the foot support member is pivotally connected to the rocker link. Hand brakes are adapted to the first and second wheels and connected to a brake levers on the handlebar by cables.

Application of alternating body weight on the stabilized pedals with the feet cause the crank to rotate and propel the second wheel with the drive coupling. Since the pedal angles are predetermined to maintain the heel upon the pedals, full body weight can safely be applied to the pedals with the heel of the foot in contact with the curved portion of the pedals for efficient power transfer to the second wheel. Once cruising speed has been reached, the feet may be repositioned more forward where the toe contacts the toe stop for easy pedaling to maintain speed.

A grinder bar is attached to the frame generally horizontal positioned below the bearing housing for the crank. The grinder bar allows the exercise scooter to be raised off the ground to be supported by a rail during operation as a rail stunt. A step is attached to the frame positioned above the crank bearing housing. The step provides foot support other than the pedals for trick riding.

A frame extension extends to the rear of the exercise scooter to support one or more rollers. When the front wheel is elevated, the rollers contact the ground preventing a further rise in the front wheel. Foot pegs are positioned between the axle of the rear wheel and rollers. When body weight is moved to the foot pegs, the front wheel is elevated and the rollers make contact with the ground. This stunt is referred to as a "wheelie".

Application of body weight on the pedal provides propulsion similar to a bicycle. Pedaling may be continued while using a seat (not shown). The step can be used for foot support during the rail stunt. Foot pegs are available for the wheelie stunt.

Coasting is comfortable when the pedals are positioned generally parallel to allow support for each foot. A one way clutch in the second wheel allows the pedals to be reversed to the coasting mode or positioned for easy starting.

In summary, this invention provides the user with pedal operation with little or no impact to the body to propel an exercise scooter. The curved pedal ends assure a stable foot position during the downward power stroke. Certain stunts are easier to achieve with the addition of the grinder bar, step and frame extension with foot pegs.

DETAILED DESCRIPTION OF THE EMBODIMENTS

Figure 1:
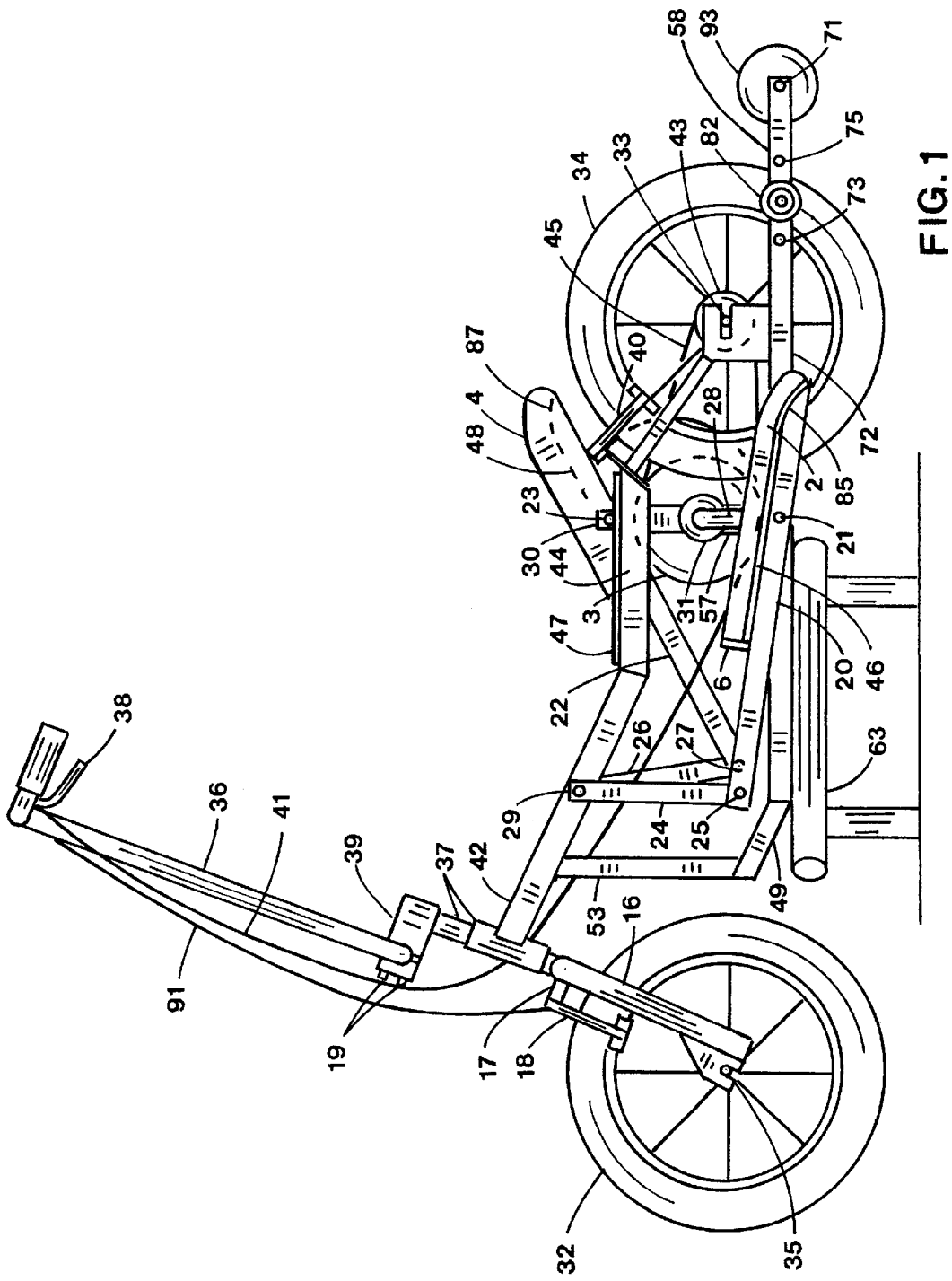
FIG. 1 is a left side elevation of the preferred embodiment of an exercise scooter constructed in accordance with the present invention with pedals shown in the highest and lowest positions.

Referring to the drawings in detail, pedals 46,48 are shown in FIG. 1 in generally their highest and lowest positions of the preferred embodiment. Pedals 46,48 are supported by foot support members 20,22. Cranks 28,30 are maintained generally 180 degrees apart and are rotatably connected to crank housing 31. Foot support members 20,22 are connected to cranks 28,30 at crank pivots 21,23 and to rocker links 24,26 at pivots 25,27. Rocker links 24,26 are connected to frame 42 at pivot 29.

First wheel 32 is rotatably connected to fork 16 at axle 35. Fork 16 is rotatably connected to fork housing 37 to accommodate steering. Knobs 19 lock clamp 39 to secure handlebar 36 to fork 16. When knob 19 is loosened, handlebar 36 may be folded down for stowage.

Second wheel 34 is rotatably connected to frame members 72,74 by axle 33. Sprocket 43 is connected to wheel 34 with a one-way clutch (not shown). Sprocket 3 is attached to cranks 28,30 and is engaged with sprocket 43 by chain 45. Frame members 42 and 44 are attached to crank bearing housing 31 and fork housing 37. Frame member 57 connects bearing housing 31 to frame members 72,74.

Application of body weight on pedals 46,48, cause the pedals 46,48 to follow a closed loop arcuate curve (not shown) with associated predetermined pedal angles. Pedals 46,48 have curved rearward portions 85,87 for better heel support in the upper positions. The positions of pedal ends 85,87 are farther apart than crank pivots 21,23 providing more leverage for uphill cycling. Pedals 46,48 also have toe stops 6,8 at the forward ends and side guards 2,4 to avoid contact with the crank. The foot of the user may be moved during operation to vary leverage imposed upon the crank 28,30.

Brake calipers 18 are connected to fork 16 at pivot 17. Hand lever 38 is mounted to handlebar 36 and connected to calipers 18 by cable 41. Rear wheel 34 brake calipers 40 are connected to handle 90 by cable 91.

Figure 2:
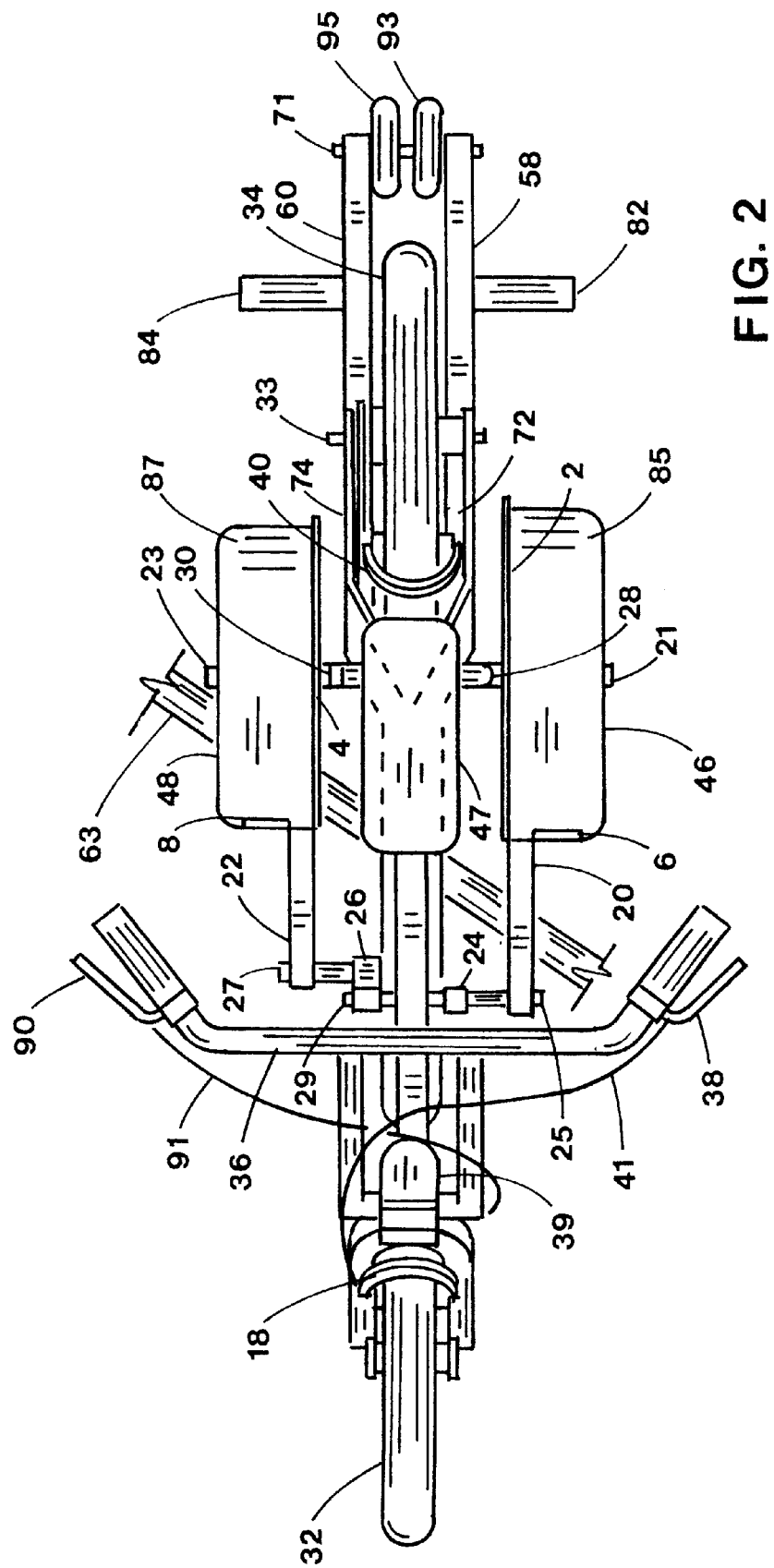
FIG. 2 is a plan view of the preferred embodiment shown in FIG. 1.

Grinder bar 49 is attached to frame member 42 by strut 53 and to crank bearing housing 31 by strut 57. Frame members 72,74 are attached to grinder bar 49 and provide support for axle 33. The grinder bar 49 is positioned generally horizontal to maintain contact with a support structure such as stationary rail 63 during the stunt. Rail 63 is shown generally angled to frame member 42 in FIG. 2 where the exercise scooter would be moving in a direction generally along the rail 63.

Frame extensions 58,60 are attached to frame members 72,74 and extend rearwards of axle 33. Rollers 93,95 are rotatably connected to frame extensions 58,60 at axle 71. Foot pegs 82,84 are attached to frame extensions 58,60 behind axle 33 to provide alternate foot support during stunts. Pegs 82,84 can be moved to other locations 73,75.

Step 47 is attached to frame 42 and 44 to provide alternate foot support during tricks. Front wheel 32 can be elevated with rollers 93,95 and second wheel 34 an contact with a supporting surface. The feet of the user can be on foot pegs 82,84 such that the body weight is shared by rollers 93,95 and second wheel 34. Elevating wheel 32 is referred to as a wheelie stunt. The different holes 73,75 provide a means for adjustment of foot pegs 82,84 to accomodate different body weight of the user. A heavier user would use hole 73 to elevate wheel 32 while a light weight user would use hole 75 to elevate wheel 32.

The present invention may be embodied in other specific forms without departing from its spirit or essential characteristics. The described embodiments are to be considered in all respects only as illustrative, and not restrictive. The scope of the invention is, therefore, indicated by the claims, rather than by foregoing description. All changes which come within the meaning and range of equivalency of the claims are to be embraced within their scope.

What is claimed is:

1. A scooter configured for user propulsion comprising:
a frame, said frame capable of supporting a user;
a first wheel, said first wheel in contact with the ground and operably associated with said frame for steering said scooter;
a second wheel, said second wheel rotatably connected to said frame and in contact with said supporting surface;
a crank, said crank positioned adjacent said second wheel protruding on either side of said frame and rotatably connected to said frame at a bearing housing;
a drive coupling, said drive coupling operably associated with said crank and said second wheel;
a pair of rocker links, each said rocker link pivotally connected to said frame;
a pair of pedals, each said pedal operably associated with said crank and respective said rocker link for each foot of said user;
a grinder bar, said grinder bar attached to said frame positioned below said bearing housing;
said pedal configured to move relative to said frame when the foot of said user is rotating said crank whereby said user can maneuver said scooter to cause said grinder bar to contact an independent stationary support while said scooter is in motion.

2. The scooter according to claim 1 first wherein said pedal further comprises a curved portion, said curved portion positioned rearward of said crank for support of the heel of said user in the upper positions of said pedal.

3. The scooter according to claim 1 further comprising a handle bar, said handlebar operably associated with said first wheel to support the hands of said user.

4. The scooter according to claim 3 further comprising a brake, said brake operably associated with the handlebar and at least one wheel.

5. The scooter according to claim 1 wherein said drive coupling comprises a pair of sprockets, one sprocket secured to said crank and the other sprocket secured to said second wheel and where said sprockets are engaged by a chain.

6. The scooter according to claim 1 wherein said stationary support comprises a rail, said rail being raised above said supporting surface independent of said scooter for contact with said grinder bar.

7. The scooter according to claim 6 wherein said grinder bar is positioned generally horizontal for contact with said rail.

8. The scooter according to claim 1 further comprising a step, said step positioned above the bearing housing and attached to said frame to support said foot of said user.

9. The scooter according to claim 1 further comprising a frame extension, said frame extension attached to said frame and protruding rearwards of said second wheel rotatable connection.

10. The scooter according to claim 9 further comprising a roller, said roller rotatably connected to said frame extension for rolling contact with the ground when said first wheel is elevated.

11. The scooter according to claim 10 further comprising foot pegs, said foot pegs attached to said frame extension forward said roller with different positions available to support said foot of said user during operation.

12. A scooter configured for user propulsion comprising:
a frame, said frame capable of supporting a user;
a first wheel, said first wheel in contact with a supporting surface and operably associated with said frame for steering said scooter;
a second wheel, said second wheel rotatably connected to said frame and in contact with said ground;
a crank, said crank positioned adjacent said second wheel protruding on either side of said frame and rotatably connected to said frame at a bearing housing;
a drive coupling, said drive coupling operably associated with said crank and said second wheel;
a pair of rocker links, each said rocker link pivotally connected to said frame;
a pair of pedals, each said pedal operably associated with said crank and pivotally connected at a forward portion to said rocker link for each foot of said user;
said pedal having a turned portion, said turned portion positioned rearward of said crank;
said pedal configured to move relative to said frame when the foot of said user is rotating said crank whereby said turned portion of said pedal can be used by said user to support the heel of said foot during operation of said scooter.

13. The scooter according to claim 12 further comprising a step, wherein said step is positioned generally horizontal to support said foot of said user.

14. The scooter according to claim 12 further comprising a frame extension, said frame extension attached to said frame and protruding rearwards of said second wheel rotatable connection.

15. The scooter according to claim 14 further comprising a roller, said roller rotatably connected to said frame extension for contact with said supporting surface when said first wheel is elevated.

16. The scooter according to claim 14 further comprising foot pegs, said foot pegs attached to said frame extension available to support said foot of said user during operation.

17. The scooter according to claim 12 further comprising a grinder bar, said grinder bar attached to said frame below said bearing housing for contact with an independent stationary support during operation of said scooter.

18. A scooter configured for user propulsion comprising:
a frame, said frame capable of supporting a user;
a first wheel, said first wheel in contact with a supporting surface and operably associated with said frame for steering said scooter;
a second wheel, said second wheel rotatably connected to said frame and in contact with said ground;
a second wheel axle, said second wheel axle rotatably supporting said second wheel to said frame;
a crank, said crank positioned adjacent said second wheel protruding on either side of said frame and rotatably connected to said frame at a bearing housing;
a drive coupling, said drive coupling operably associated with said crank and said second wheel;
a pair of pedals, each said pedal operably associated with said crank for each foot of said user;
a frame extension, said frame extension attached to said frame protruding rearwards;
a roller, said roller rotatably connected to said frame extension;
a pair of foot pegs, said foot pegs attached to said frame extension rearwards of said second wheel axle;

Adjustment means, said adjustment means configured to allow said foot pegs to be repositioned along said frame extension to accomodate different body weights of said user;

said pedal configured to move relative to said frame when the foot of said user is rotating said crank whereby said user can reposition a foot to said foot peg to elevate said front wheel during operation of said scooter.

19. The scooter according to claim 18 further comprising a grinder bar, said grinder bar attached to said frame below said bearing housing for contact with an independent stationary support during operation of said scooter.

20. The scooter according to claim 18 further comprising a step, said step positioned above the bearing housing and attached to said frame to support said foot of said user.

21. The scooter according to claim 18 further comprising a roller, said roller rotatably connected to said frame extension for contact with said supporting surface when said first wheel is elevated.

22. The scooter according to claim 18 wherein said pedal has curved ends, said curved ends providing heel support during operation in the upper positions of said pedal.

23. A method of riding a scooter of the type having a frame supported by a pair of wheels, a handlebar to steer one of the wheels, a grinder bar attached to the frame, left and right cranks supported by the frame and rotatable relative thereto about a common crank axis positioned adjacent the other wheel, left and right rocker links pivotally connected to the frame, and left and right pedals pivotally connected to respective cranks and rocker links, wherein rotation of the cranks is linked to propulsion of a wheel, comprising the steps of:

standing with a respective foot on each pedal;

steering one of the wheels with the handlebar;

moving the pedals to propel the other wheel;

moving the scooter relative to the ground;

maneuvering the scooter with the grinder bar in contact with an independent stationary support.

24. A method of riding a scooter of the type having a frame supported by a pair of wheels each having an axle, a handlebar to steer one of the wheels, a frame extension attached to the frame protruding rearwards from the other wheel, a foot peg attached to the frame extension distal an axle, means to adjust the position of the foot peg along the frame extension to accomodate different body weights of the user, left and right cranks supported by the frame and rotatable relative thereto about a common crank axis positioned adjacent the other wheel, and left and right pedals pivotally connected to respective cranks, wherein rotation of the cranks is linked to propulsion of a wheel, comprising the steps of:

standing with a respective foot on each pedal;

steering one of the wheels with the handlebar;

moving the pedals to propel the other wheel;

moving the scooter relative to the ground;

moving a foot to the foot peg;

maneuvering the scooter to elevate one of the wheels.

* * * * *